Oct. 17, 1939.  G. MEACHAM  2,176,636
TRUCK
Filed Feb. 11, 1938    5 Sheets-Sheet 1
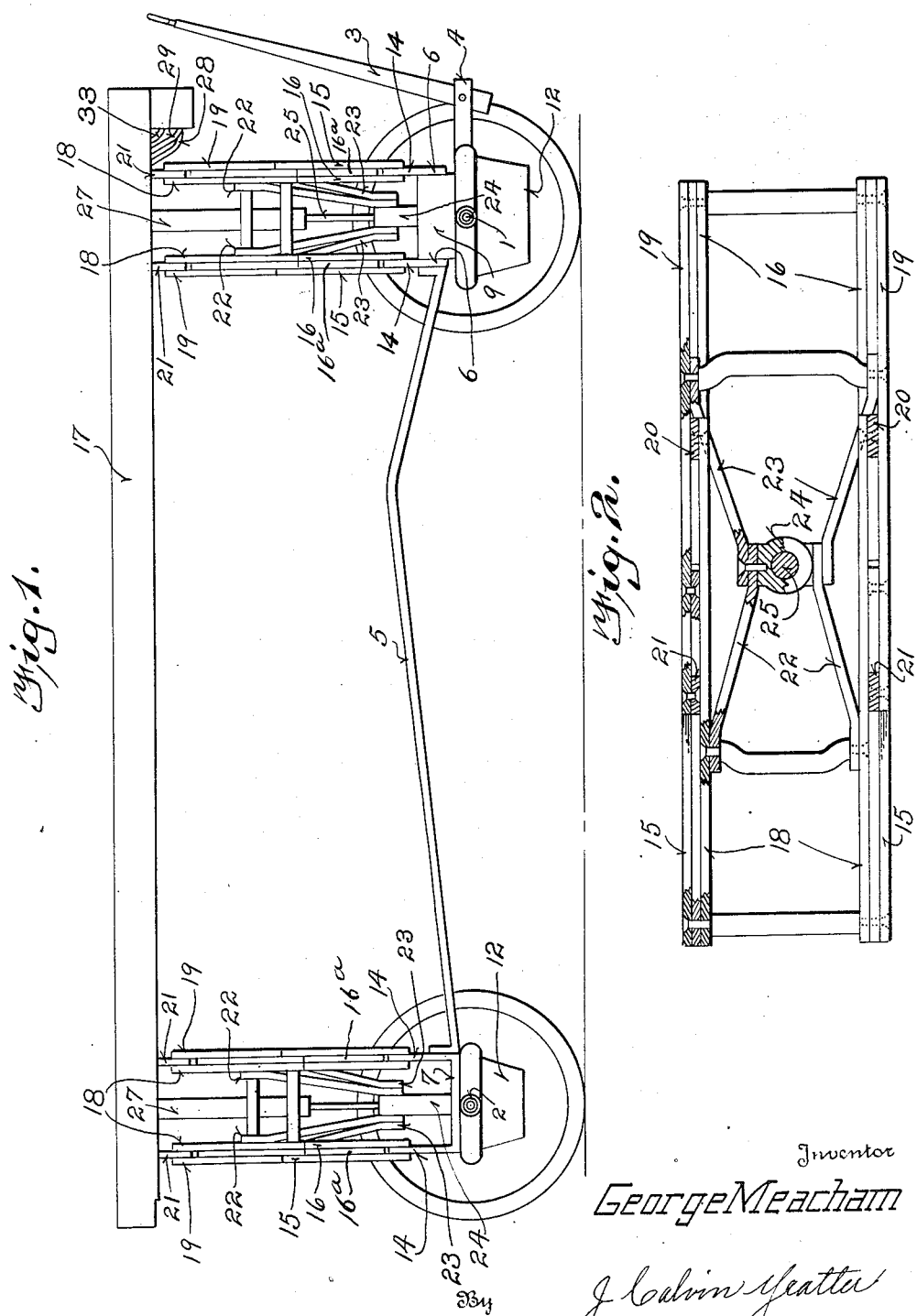
Inventor
George Meacham
By J Calvin Yeatter
Attorney Oct. 17, 1939.　　　　G. MEACHAM　　　　2,176,636
TRUCK
Filed Feb. 11, 1938　　　5 Sheets-Sheet 2

Inventor
George Meacham
By J. Calvin Yeatter
Attorney

Oct. 17, 1939.   G. MEACHAM   2,176,636
TRUCK
Filed Feb. 11, 1938   5 Sheets-Sheet 3
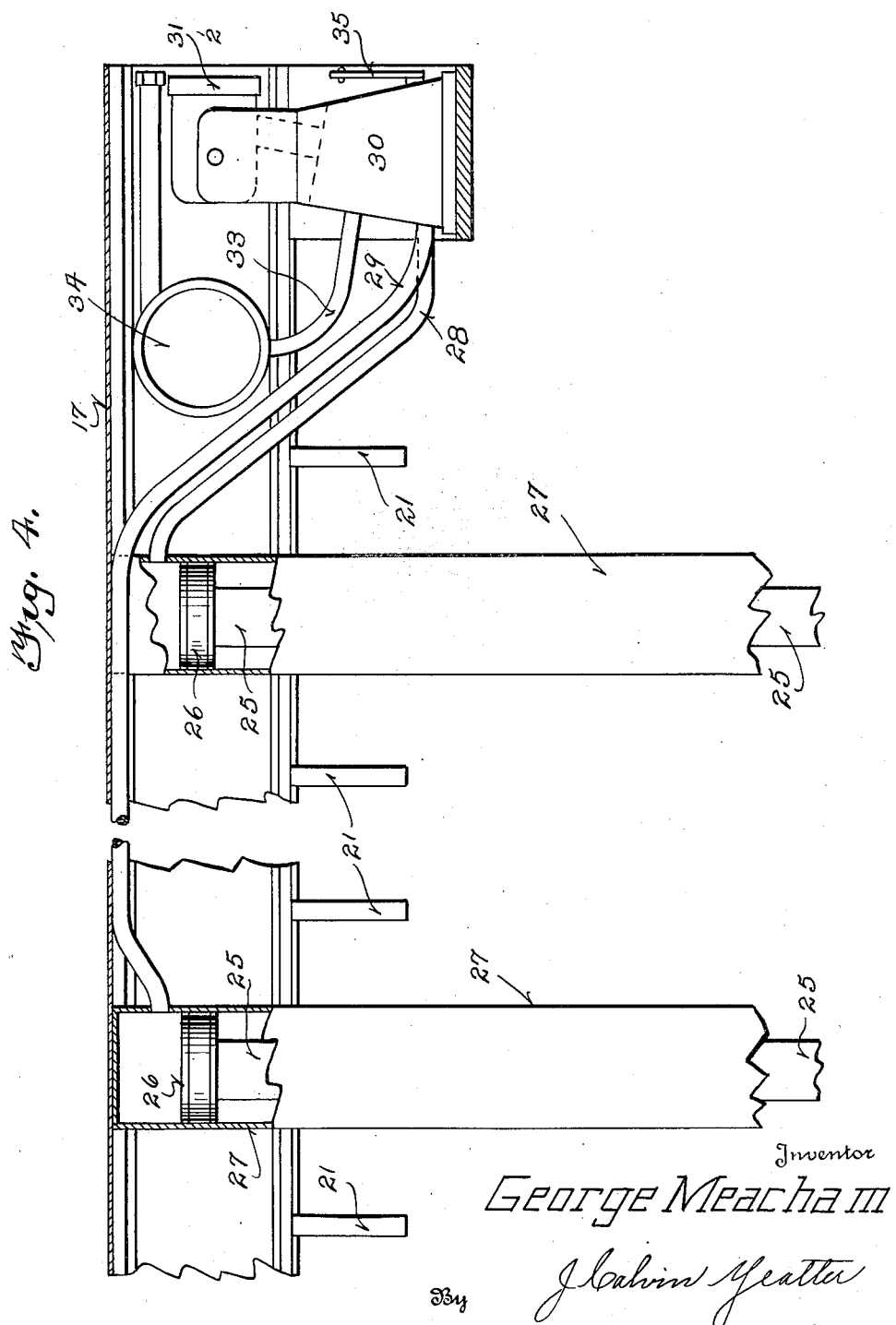

Oct. 17, 1939.  G. MEACHAM  2,176,636
TRUCK
Filed Feb. 11, 1938  5 Sheets-Sheet 4
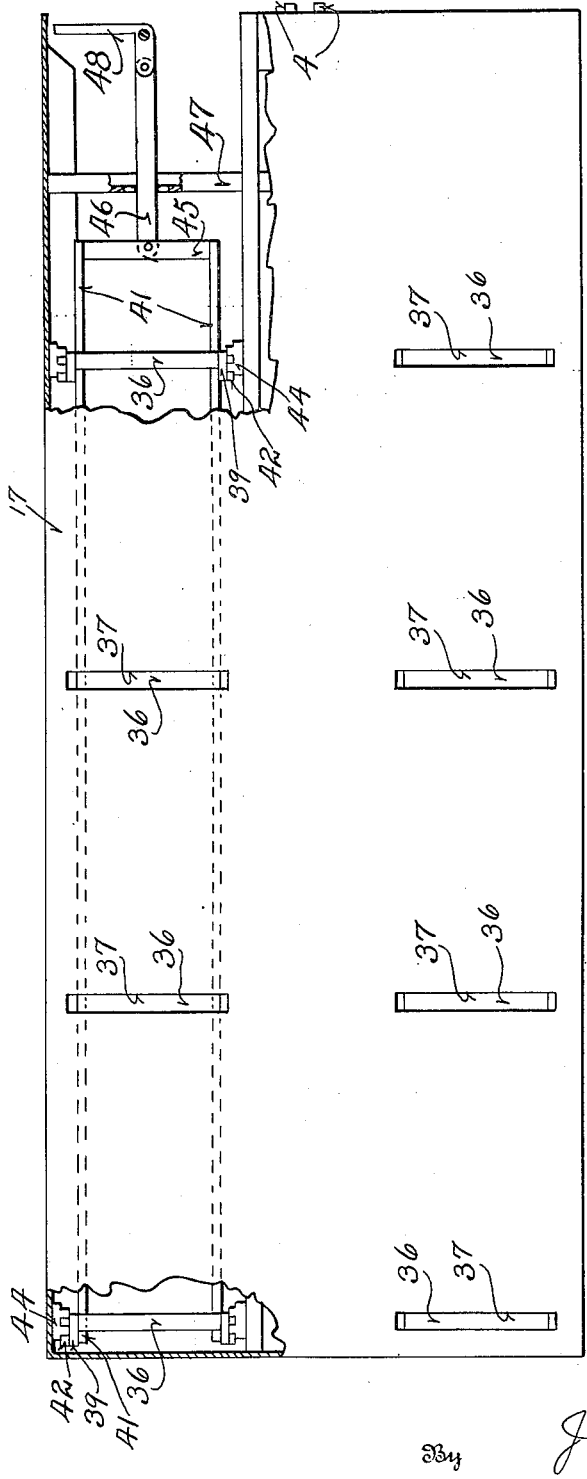
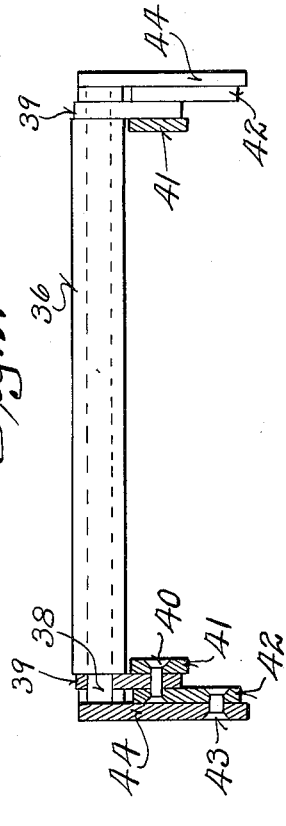
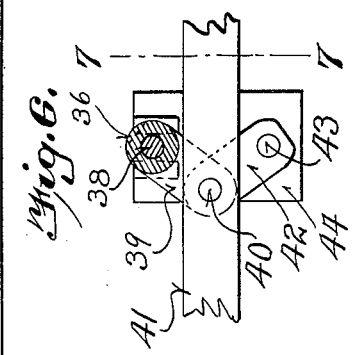
Inventor
George Meacham

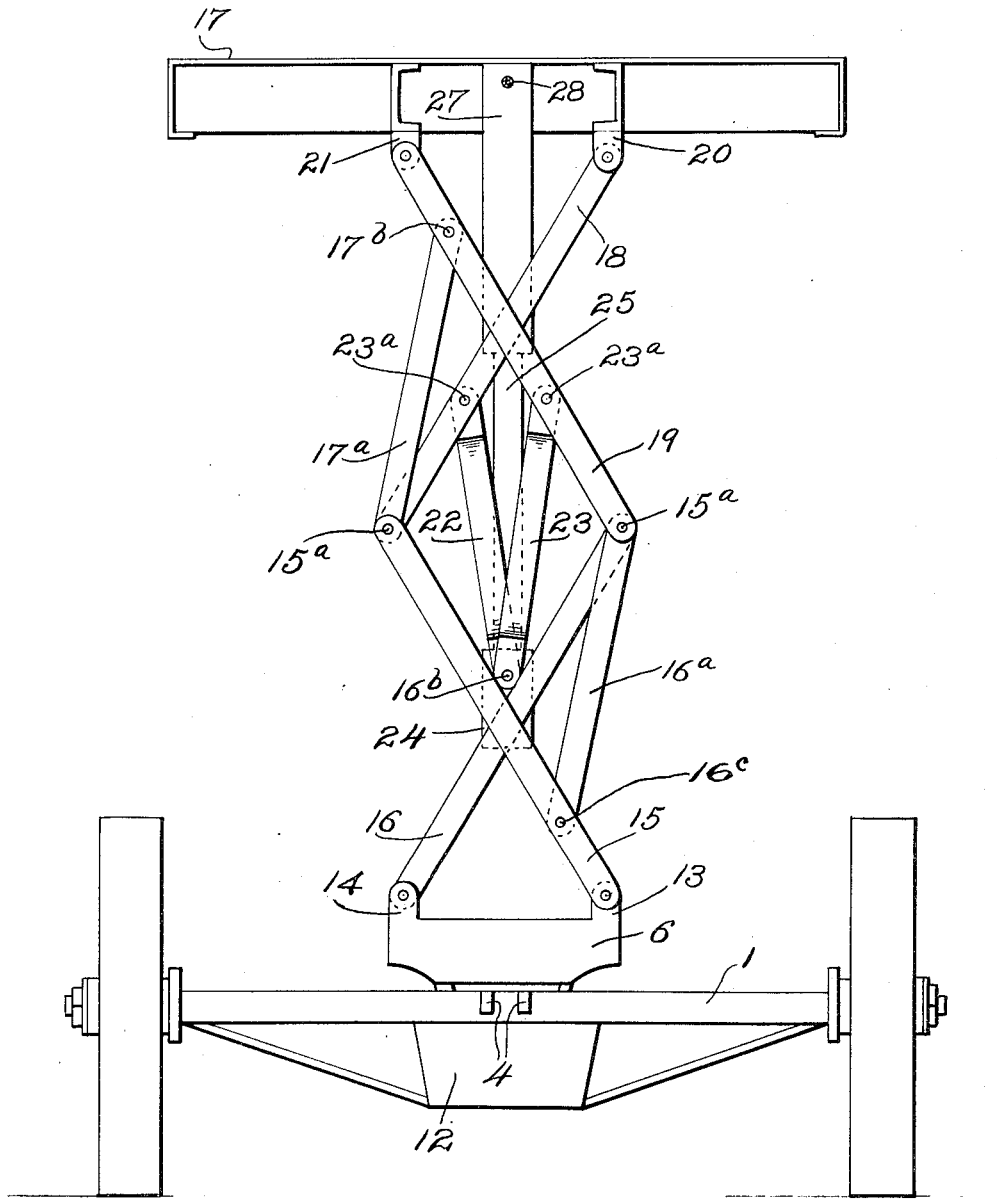

Patented Oct. 17, 1939

2,176,636

UNITED STATES PATENT OFFICE 2,176,636

TRUCK

George Meacham, Clearwater, Fla.

Application February 11, 1938, Serial No. 190,090

5 Claims. (Cl. 214—84)

My invention relates to improvements in trucks and especially in that class of trucks designed for use in handling baggage, heavy furniture, bricks, and the like, in which it is desired to raise the articles to a higher level in some instances and to lower them from a higher level in other instances.

My invention has for its object to provide novel means for effecting the raising and lowering of the platform of the truck and novel means for raising and lowering rollers carried by the platform by which movement of the load article onto and off the platform will be facilitated.

With these objects and other objects hereinafter set forth my invention consists in and comprises the construction and combination of elements hereinafter described and claimed.

Referring to the drawings:

Figure 1 is a side view of a truck having my invention embodied therein.

Figure 2 is a horizontal sectional view on line 2—2 of Figure 3.

Figure 4 is a detail view partly in section and on an enlarged scale of the hydraulic mechanism for raising and lowering the platform.

Figure 5 is a top plan view of the platform and the roller raising means.

Figure 6 is a detail view partly in longitudinal section of one of the roller raising devices.

Figure 7 is a cross sectional view on line 7—7 of Figure 6.

Figure 8 is an end elevation of the truck with the platform elevated and the lazy tong structure elongated.

Figure 3:
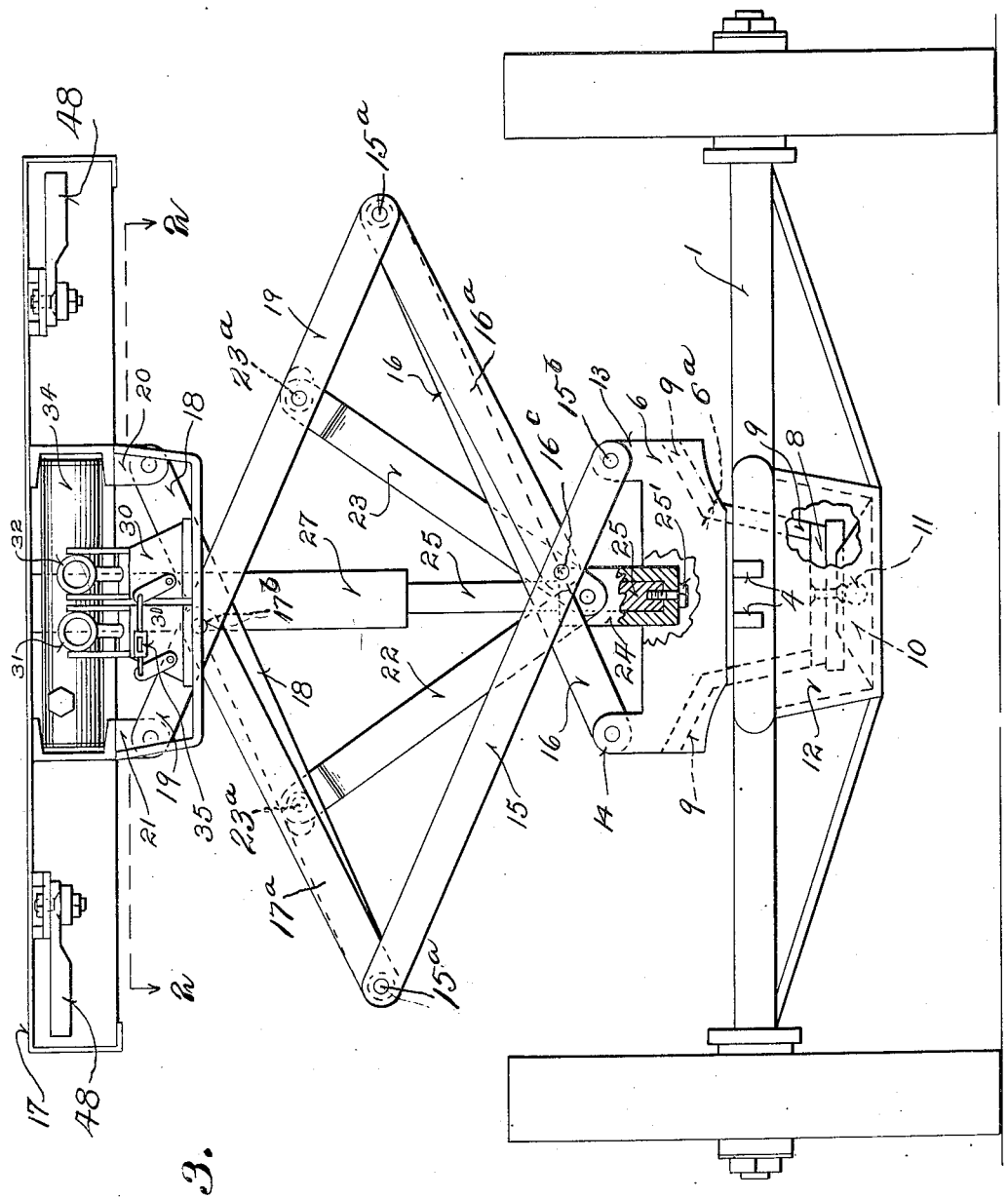
Figure 3 is an end view on an enlarged scale of the truck and the raising and lowering mechanism.

In the drawings 1 and 2 are axles provided with wheels at their ends. 3 is a tongue for pulling the truck pivoted to arms 4 extending forward from front axle 1. 5 is a coupling rod connecting the bracket 6 carried by front axle 1 with bracket 7 carried by rear axle 2. Bracket 6 is connected to fifth wheel 8 by support plate 9. Fifth wheel 8 is supported in bracket 10 by pin 11, these elements being enclosed in housing 12 which is supported by front axle 1. The construction at the rear axle is the same except that the fifth wheel and its pivot pin is omitted.

Brackets 6 and 7 carried by the front and rear axles, respectively, are provided at their side ends with ears 13 and 14. To ear 13 is pivoted the lower end of link 15 and to ear 14 is pivoted the lower end of link 16. Links 15 and 16 are elements of a lazy tong structure for elevating platform 17, the upper end of link 15 being pivoted at 15a to the lower end of link 18, and the upper end of link 16 being pivoted at 15a to the lower end of link 19. At their upper ends links 18 and 19 are pivoted to ears 20 and 21, respectively, carried by platform 17.

To the upper links 18 and 19 midway between the ends are pivotally connected at 23a the upper ends of actuating links 22 and 23, the lower ends of which are pivotally connected at 16b to vertically movable member or cap 24 secured on the lower end of piston rod 25 by screw 25'. The upper end of piston rod 25 carries piston 26 which is movable within cylinder 27.

It will be noted that ears 13, 14, 20, and 21, and links 15, 16, 18 and 19, are in duplicate as indicated in Figure 1, and are the same over the rear axle as over the front axle. Supporting links 16a and 17a, and the actuating links 22 and 23 are also in duplicate, as best shown in Figures 3 and 8, and are the same in the lazy tong structure at the front as in the rear.

Piston 26 is actuated by hydraulic means supplied to the front and rear cylinders 27 by pipes 28 and 29 respectively leading from compression cylinders 31, 32, to which liquid is supplied by pump 30. 34 is a reservoir for the oil or other liquid and supplies liquid to the pump 30. Pump 30 is of usual construction and is operated by hand lever 35. While only one pump 30 is shown it is to be understood that the cylinders 27 and the parts operated by the piston 26 are the same at the front and the rear axles.

36 indicates rollers arranged in slots 37 in platform 17. Two rows of four each of these rollers are shown but a greater or less number may be used. Each roller has each of its journals 38 carried in the upper end of a lever 39 which has its lower end pivoted at 40 to the upper end of lever 42, the lower end of which is pivoted at 43 in a bracket 44 depending from platform 17. Pivot 40 extends through longitudinal rod 41 so that movement of this rod in one way or the other will cause roller 36 to be raised or lowered in its slot 37.

There will be a rod 41 for each end of roller 36 and one end of each rod is secured to a bar 45 to the centre of which is secured a longitudinal rod 46 which extends through a guide slot in cross bar 47. To the free end of rod 46 is pivoted operating handle 48.

While the above construction for lifting the rollers is described as of one set it will be understood that this construction is to be duplicated for each set.

In operation when a heavy article is to be transported the hydraulic pump mechanism is operated to bring the platform to the proper level, the liquid from the pump acting upon the pistons 26 in cylinder 27 at both front and rear axles, the piston rods acting through caps 24 to actuating levers 22, 23, and lazy tong levers 15, 16, 18, 19, to raise or lower the platform.

When the platform is at the desired level longitudinal rods 41 will be operated to raise the surfaces of rollers 36 above the surface of the platform so as to facilitate movement of the heavy article into place on the platform. When it is in place the rollers are caused to drop into their slots leaving the article to be transported at rest.

The operation of the lazy tong lifting mechanism is explained as follows: reference being had particularly to Figure 1, showing a side view of the lazy tong structure collapsed downwardly and the platform in extreme lowered position, and to Figure 8 wherein the platform is elevated and the lazy tong structure elongated.

In Figure 1 the platform 17 is shown in extreme lowered position, the lazy tong lifting mechanism being collapsed downwardly towards the brackets 6 and 7, at which time the cap 24 secured to the lower end of piston rod 25 is received within the chamber 6a of the brackets. Actuating links 22 and 23 being pivotally connected at 23a to links 18 and 19 and to the cap 24 at point 16b, prevent the downward movement of the cap 24.

When fluid is forced into the upper end of cylinder 27, as the cap member 24 being at rest in chamber 6a of the bracket can not move downwardly, the platform 17 along with the cylinder 27 will move upwardly, and will be guided through link connections 15 and 16, which are connected to the links 18 and 19 at pivot points 15a. In this upward movement the actuating links 22 and 23, which are pivotally connected at their upper ends at pivot points 23a to the links 18 and 19 and at their lower ends at 16b to cap 24, exert a downward and inward pull on links 18 and 19.

During this upward movement as the lazy tong structure contracts, the lifting and bracing links 16a and 17a move towards a vertical position and exert an upward bracing effect. The bracing link 16a is pivotally connected at 15a to links 16 and 19, and has its other end pivotally connected at 16c to the link 15 spaced from its pivotal point, hence it will be seen that as the lazy tong contracts during a platform raising operation, the pivotal point 16c will arcuately move upwardly and outwardly so that the link 16a will approach a vertical bracing position. During this operation the upper pivotal point 17b of the link 17a will arcuately move downwardly and outwardly, thereby causing the link 17a to swing on its pivotal points 15a and 17b towards a vertical position for bracing and supporting the lazy tong structure when the platform is raised. The platform in the fully raised position with the lazy tong structure elongated and the bracing links in a nearly vertical position is best shown in Figure 8. The bracing links 16a and 17a also prevent side play or pivotal movement of the lazy tong structure when fully extended and it will be noted, the higher the platform is raised, the greater the outward movement of pivotal points 16c and 17b. Pivotal points 16c and 17b are equidistant from the adjacent pivotal points of links 15 and 19, hence it will be seen that even though the movement of the links 16a and 17a is opposed, there will be an equilization of movement of the parts for maintaining the platform horizontal.

In operation the actuating links 22 and 23 actually carry the cap 24 upwardly thus giving a much greater range of lift than would be possible by having the lower end of the piston rod and cap fixed in the chamber 6a of the brackets.

While the construction and arrangement of elements has been thus described as shown in the drawings, I do not desire to be limited to the precise construction shown and described as it is evident that changes in detail may be made without departing from my invention.

Having thus described my invention what I claim is:

1. A truck having a platform movable vertically with reference to the axles, means between the platform and the axles for effecting the vertical movement of the platform, rollers carried by the platform and means for causing the rollers to move vertically to project above the upper surface of the platform and to be depressed out of projection comprising lazy-tongs carrying the journals of the rollers in the upper ends of the upper links and having the lower ends of the lower links carried by fixed pivots and a sliding rod having a pivotal connection with the joint between the upper and lower links.

2. A truck having a platform movably vertical with reference to the axles, hydraulically operated means between the platform and the axles for effecting the vertical movement of the platform, rollers carried by the platform and means for causing the rollers to move vertically to project above the upper surface of the platform and to be depressed out of projection comprising lazy-tongs carrying the journals of the rollers in the upper ends of the upper links and having the lower ends of the lower links carried by fixed pivots and a manually operated sliding rod having a pivotal connection with the joint between the upper and lower links.

3. In a vehicle having a platform movable vertically with reference to its axles, a hydraulic lift adapted to move said platform, means for guiding the platform during the movement thereof comprising, lazy tongs having a pair of upper links pivotally connected at their upper ends to the platform and a pair of lower links pivotally connected at their lower ends to an element carried by the axles, the said upper and lower links being pivotally connected together adjacent their opposite ends and means operateable by the said lazy tongs for bracing the same when the said lazy tongs are extended.

4. In a vehicle having a platform movable vertically with reference to its axles, a vertical hydraulic lift including a piston rod extending downwardly from said lift and adapted to move said platform, means for guiding the platform during the movement thereof comprising, lazy tongs having a pair of upper links pivotally connected at their upper ends to the platform and a pair of lower links pivotally connected at their lower ends to an element carried by the axles, said upper and lower links being pivotally connected together adjacent their opposite ends, a pair of links of substantially the same length each having one of their upper ends pivotally connected to the upper links of one of the lazy tongs mid-way between their ends and means for and having their lower ends pivotally connected to the lower end of the said piston rod.

5. In a vehicle having a platform movable vertically with reference to its axles, a vertical hydraulic lift including a piston rod extending downwardly from said lift and adapted to move said platform, means for guiding the platform during the movement thereof comprising, lazy tongs having a pair of upper links pivotally connected at their upper ends to the platform and a pair of lower links pivotally connected at their lower ends to an element carried by the axles, said upper and lower links being pivotally connected together adjacent their opposite ends, a pair of links of substantially the same length each having one of their upper ends pivotally connected to the lazy tong links and their opposite ends connected to the lower end of the said piston rod.

GEORGE MEACHAM.